United States Patent [19]
Ester et al.

[11] 3,843,721

[45] Oct. 22, 1974

[54] MANUFACTURE OF VINYL ACETATE

[75] Inventors: Wilhelm Ester, Herne; Dietrich Schlüter, Wanne-Eickel; Wilhelm Heitmann, Herne, all of Germany

[73] Assignee: VEBA-Chemie Aktiengesellschaft, Gelsenkirchen-Buer, Germany

[22] Filed: Sept. 11, 1969

[21] Appl. No.: 857,228

[30]    Foreign Application Priority Data
   Sept. 18, 1968   Germany............................ 1793447

[52] U.S. Cl............................................. 260/497 A
[51] Int. Cl...................... C07c 67/04, C07c 69/14
[58] Field of Search................................. 260/497 A

[56]         References Cited
         UNITED STATES PATENTS

| | | |
|---|---|---|
| 3,190,912 | 6/1965 | Robinson........................ 260/497 A |
| 3,277,158 | 10/1966 | Schaeffer....................... 260/497 A |
| 3,346,624 | 10/1967 | Schaeffer et al................ 260/497 A |
| 3,450,748 | 6/1969 | Schaeffer....................... 260/497 A |
| 3,463,740 | 8/1969 | Ketley et al.................... 260/497 A |
| 3,530,172 | 9/1970 | Clark et al...................... 260/497 A |
| 3,578,609 | 5/1971 | Haag et al...................... 260/497 A |
| 3,600,429 | 8/1971 | Kronig et al.................... 260/497 A |
| 3,625,862 | 12/1971 | Freamo........................... 260/497 A |
| 3,641,113 | 2/1972 | Fernholz et al................. 260/497 A |

FOREIGN PATENTS OR APPLICATIONS 1,061,084   3/1967   Great Britain.................. 260/497 A

OTHER PUBLICATIONS

Ohmae, Chemical Economy & Eng. Review, Nov. 1972, Vol. 4, No. 11, 46–57.

*Primary Examiner*—Lorraine A. Weinberger
*Assistant Examiner*—Richard D. Kelly
*Attorney, Agent, or Firm*—Burgess, Dinklage & Sprung

[57]          ABSTRACT

A process for the manufacture of vinyl acetate from ethylene, oxygen and acetic acid maintained in the liquid phase in the presence of a metal of the Eight Group of the Periodic System carried on a suitable support in the presence of a redox system with sufficient oxygen being present to effect reoxidation of the system.

8 Claims, No Drawings

MANUFACTURE OF VINYL ACETATE

PRIOR ART

Although the classical method of preparing vinyl acetate has been to synthesize it from acetylene and acetic acid, a number of procedures have been disclosed recently which make use of ethylene. All these procedures are based on the oxidative esterification of ethylene, and they can be divided into reactions in the gaseous phase and reactions in solution. Common to all methods is the use of a noble metal catalyst, usually in the form of palladium.

From the work of Moiseev et al. in "Doklady Akademii Nauk, SSFR," 133, pages 377–380 (1960), it is known that vinyl acetate can be obtained in solution by reacting ethylene with glacial acetic acid, palladium (II) chloride and sodium acetate. Moiseev states that this process can be performed in the presence of an oxidizing agent such as p-benzoquinone. This compound oxidizes the palladium as long as the palladium is present in sufficient concentration. So, in order to be able to use this process economically, it is necessary continuously to regenerate the consumed p-benzoquinone.

The complete regeneration of the p-benzoquinone has presented great difficulties. One method has been to oxidize the hydroquinone with air to p-benzoquinone with the aid of another noble metal, namely rhodium (W. German Pat. 1,264,436). The situation is more favorable, however, in the case of the inorganic redox systems, such as Cu(II)/Cu(I) salts and Fe(III)/Fe(II) salts, the former being used in the form of their acetates and the latter in the form of their halides. In this case the oxidation to the higher valency can be successfully performed with oxygen only.

In some of the prior-art methods of vinyl acetate synthesis in solution, the process takes place in two steps: (1) the formation of vinyl acetate and (2) regeneration of the catalyst system after separation of the vinyl acetate by distillation. In the one-step process, however, all the reactions take place together: the ethylene dissolves the Pd salt complex and reacts with the acetic acid to form vinyl acetate and metallic palladium. The palladium in turn is oxidized by $Cu_{II}$ salt to $Pd_{II}$ salt with the simultaneous formation of $Cu_I$ salt, while the $Cu_I$ salt reacts in turn with oxygen to form the $Cu_{II}$ salt.

In the gaseous phase processes, the palladium is carried on a support, which can be, for example, a silica, aluminum silicate, aluminum oxide or carbon. In addition, the prepared catalyst is impregnated with an alkali acetate or alkaline earth acetate. The gaseus mixture of ethylene, oxygen and acetic acid is passed through this catalyst. After several weeks of operation, the activity of the catalyst diminishes considerably and regeneration must be undertaken.

The regeneration is performed with nitrogen and/or air, and by removing the by-products it brings about an enlargement of the active catalyst surface area (W. German Pat. 1,244,766).

THIS INVENTION

It has now been found that the catalytic formation of vinyl acetate in the solution process takes place very rapidly. Accordingly, the dissolving of the palladium, even in the form of its salt, will not take place if care is taken to see that noble metal salt is constantly formed in the quantity that is needed for the performance of the secondary reaction.

The following reaction diagram may be helpful:

1. $2\ Pd + 4\ CuCl_2 \rightarrow 2\ PdCl_2 + 4\ CuCl$
2. $2\ PdCl_2 + 2\ C_2H_4 \rightarrow (PdCl_2 \cdot C_2H_4)_2$
3. $(PdCl_2 \cdot C_2H_4)_2 + 2\ CH_3COOH \rightarrow 2\ CH_2{=}CH{-}O{-}CO{-}CH_3 + 4\ HCl + 2\ Pd$
4. $4\ HCl + 4\ CuCl \xrightarrow{O} 4\ CuCl_2 + 2\ H_2O$ Equation (1) formulates the reaction as it takes place in the presence of chlorine ions; whether the salt formation takes place exclusively through $PdCl_2$ cannot easily be determined in view of the great excess of acetate ions. It can, however, be said that a formation of vinyl acetate takes place in the absence of chlorine ions, although the quantity produced is small. The second step is then the formation of the $PdCl_2$–$C_2H_4$ complex compound formulated by Kharasch (Equation 2). This complex reacts according to Equation 3 with acetic acid or salts thereof to form vinyl acetate, hydrochloric acid (or salts thereof) and metallic palladium. The acetic acid salts supply acetate ions and cause an acceleration of the vinyl acetate synthesis. Equation 4 then reflects the oxidation of the Cu(I) salt to the C(II) salt; in other words, the oxygen present in the system serves to oxidize the co-catalyst.

The invention is concerned with a continuous process for the manufacture of vinyl acetate, in which a high consumption of the noble metal does not have to be tolerated and, on the other hand, a high yield is achieved per unit of volume per unit of time.

According to this invention, the process is operated at a temperature below the boiling point of the acetic acid, the metal catalyst is carried on an inorganic support, and oxygen is added to the reaction system in such a quantity that the reaction system for the oxidizing of the metal to the corresponding metal salt is restored to the state of higher valency immediately after the reduction.

The inorganic support can be aluminum silicates (montmorillonite, bentonite, pumice), silica gel, asbestos, aluminum oxides, aluminum phosphate and an active carbon such as wood charcoal and graphite. The catalyst support has an interior surface area of 10 to 300 m²/g, preferably 50 to 200 m²/g, and the metal catalyst is preferably added thereto in amounts in the range of 3 to 12 weight percent.

As will appear from the examples, the catalyst system used is characterized by a uniform activity and by great selectivity. The loss of chlorine ions due to the development of small amounts of halogenated by-products can be compensated with free hydrochloric acid, if care is taken to see that, if the hydrochloric acid comes in contact with the catalyst system under the conditions of the reaction, it is in the form of its salts. This condition is fulfilled in the case of the salt concentrations that are present.

A particularly desirable additional advantage of the process of the invention is that, with the constant formation of noble metal salts, a maintenance of the purity of the catalyst bed is simultaneously achieved.

When a Cu(II) - Cu(I) redox system is used, the oxygen is preferably present in an amount sufficient to maintain the Cu(II) salt content constantly at at least 90 percent of the total salt concentration. The acetate ions are preferably derived from lithium, barium potassium and sodium acetates, used in concentration of from 30 to 50 g/l. The moisture content of the solution is preferably less than 2 percent, and is usually 0.3 to 1.5 percent, to prevent the formation of large amounts of acetaldehyde by hydrolysis.

EXAMPLES

Example 1

In an experimental apparatus having a capacity of 5.4 liters there were charged 3 liters of acetic acid in which 108 g of Cu(II) acetate, 150 g of sodium acetate and 36 g of NaCl were dissolved or partially suspended. The moisture content of the solution was 0.7 percent and the chlorine ion concentration amounted to 4.4 g per liter. The solution was pumped at a temperature of 113°–115°C and at a rate of 40 l/h through a catalyst tube 1 m long and 2.5 cm in diameter which was about 80 percent filled with 250 g of catalyst. In order to utilize the entire length of the catalyst chamber, the solution was raised to temperature in a preliminary heater.

The catalyst consisted of an aluminum silicate which had been impoverished of aluminum by treatment with hydrochloric acid followed by neutralization. 750 g of the raw catalyst were boiled in 1,310 ccm of 20 percent HCl with refluxing, and after 10 hours the solution was poured off and the catalyst was treated again for 10 hours with the same quantity of HCl. The catalyst was heated 15 times for one half hour with refluxing, in 1 liter of water each time. The catalyst, still containing 50 ppm of HCl was impregnated with a PdCl$_2$ solution after drying, so that, after reduction with hydrogen, a supported catalyst containing 3 percent is produced.

Prior to the impregnation, the catalyst contained 94.0 percent SiO$_2$, 4.13 percent Al$_2$O$_3$, 0.52 percent Fe$_2$O$_3$ and some CaO, and had an interior surface area of 7.9 m$^2$/g and a pore volume of 0.668 l/kg. Upon the application of the palladium, the pore volume diminished to 0.615 l/kg and the interior surface area to 6.41 m$^2$/g.

On the basis of the atomic radius of palladium, AR = 1.37 A, the Loschmidt number $N_L = 6.023 \cdot 10^{23}$, and the interior surface area of 7.9 m$^2$/g, a computation was made of the thickness of the palladium coating on the catalyst surface. It was found that, if the atmoic spheres are considered to be approximately equal to small circles having the area $\pi^2$, 3 g Pd covers an area of 1,002 m$^2$. On the other hand, 100 g of support have only 790 m$^2$. Consequently, 73.5 percent of the Pd was a monomolecular coating on the catalyst and 26.5 percent of it was a bimolecular coating.

The system was then put under a pressure of 30 atmospheres with a mixture of ethylene and oxygen so that the composition in the solution amounts to 95 percent by volume of ethylene and 5 percent oxygen. During the experiment, more ethylene and oxygen were fed in, in a ratio of 2:1, so that the pressure remained constant and the ratio of 95 parts of C$_2$H$_4$ and 5 parts of oxygen by volume was maintained in the solution.

Within one hour, 94.2 liters of ethylene were reacted, of which 88 percent went into vinyl acetate, corresponding to a vinyl acetate yield of 795 g/l·h. The yield of acetaldehyde amounted to 56.3 g/l·h, which is produced by the hydrolysis of the vinyl acetate. The solution was then pumped into a column and the acetaldehyde and vinyl acetate were removed by distillation, a portion of the water that forms in the regeneration of Cu(I) acetate to Cu(II) acetate passing over azeotropically with the vinyl acetate.

In order to oxidize all of the Cu(I) salt, the solution was fed while still hot into a reactor at the base of which there is a glass frit through which the solution was passed with oxygen at 150°C for 2 hours. To remove moisture the solution was transferred to a second column, in which the water is removed azeotropically with benzene. After the addition of 210 ccm of acetic acid in which 0.7 g of HCl has been dissolved in gas form to compensate the halogen loss, the solution thus treated can be re-used in the vinyl acetate synthesis and its value for this purpose is unimpaired.

Example 2

120 g of Cu(II) acetate, 230 g of barium acetate and 27 g of lithium chloride at a chlorine ion concentration of 5.8 g/l and a moisture content of 0.45 percent, were dissolved in 3 liters of acetic acid. The conditions of Example 1 were modified to the extent that the process was performed at 30 atmospheres excess pressure, with a ratio of ethylene to oxygen in the solution of 93 to 7 parts by volume. In 1 hour, 102 l of ethylene had reacted, 90.4 percent of it going to vinyl acetate. The concentration in the solution amounted to 11.8 percent vinyl acetate and 0.64 percent acetaldehyde. Conversion of this to a yield in units of weight per unit of volume per unit of time gives 885 g of vinyl acetate per liter per hour, and, for acetaldehyde, 48 g/l·h. The solution was treated precisely as in Example 1, except that this time 1.2 g of HCl in 235 ccm of acetic acid was required to maintain the chlorine ion concentration.

Example 3

To achieve a continuous process the reaction tube was made larger so that the acetic acid solution would run through the catalyst only once. The reaction tube this time was 4 m long and had a diameter of 5 cm. It was filled with 4.8 kg of catalyst (3 percent palladium). 60 l of solution containing 2.4 kg Cu(II) acetate, 4.6 kg Ba acetate, 0.54 kg lithium chloride, a chlorine ion concentration of 6.0 g/l and a moisture content of 0.3 percent was passed through the catalyst. To maintain the oxygen concentration in the solution, 22.5 m$^3$ of gas per hour was pumped in parallel flow through the reaction tube (corresponding, under the conditions of operation, to 750 l/h). The residence time of the solution amounted to 7.8 min. The effluent liquid was continuously passed through a degasser in which the pressure dropped from 30 atmospheres to 1 atmosphere, and then into a distillation column. The gas from the degasser was recompressed and fed back to the circulating gas. The fresh gas was added separately to the circulating gas, in such a manner that a concentration of 95 volume-percent of ethylene and 5 volume-percent of oxygen was maintained in the solution. The vinyl acetate and water azeotrope was taken from the head of the distillation column along with some acetaldehyde. The sump of the distillation column was pumped into the regenerator, where aeration was performed at 20 atmospheres and 150°C with oxygen. The aeration was performed with a number of ring nozzles. The solution was introduced into the regenerator at the top and continuously drawn off at the bottom. The solution was then fed through a second degasser in which the unconsumed oxygen was taken out, then compressed and fed back to the regenerator. From the second degasser the solution was fed into the upper third of a second distillation column and continuously dehydrated with benzene.

In a mixing section of the apparatus, 5.5 liters per hour of acetic acid containing 15 g HCl (gaseous) in solution were fed to the solution, which was continuously taken from the sump of the second distillation column, for the purpose of supplying the necessary acetic acid and of compensating for the loss of chlorine ions. The transformation amounted to 9.1 percent of the acetic acid input. The amount of vinyl acetate produced per hour per liter of catalyst volume amounted to 1,030 g/l·h; for a total catalyst volume of 7.85 l, this corresponds to a quantity of 8.1 kg. The amount of acetaldehyde that formed diminished to 18.3 g/l·h, at a molar ratio of vinyl acetate to acetaldehyde of 28.5 to 1. The yield per gram of noble metal catalyst amounted to 55.0 g of vinyl acetate. The total transformation, with reference to the circulation rate of 15.7 cubic meters per hour of ethylene, amounted to 13.8 percent, 96 percent of the ethylene being made into vinyl acetate.

Example 4

The procedure was the same as described in Example 3, and the same salt concentrations were used; the difference was in the supported catalyst. 4.4 kg of catalyst having an interior surface area of 189 m²/g and a pore volume of 0.713 l/kg were used. The analytic composition was:

| | |
|---|---|
| $SiO_2$ | 94.6 percent |
| $Al_2O_3$ | 3.45 percent |
| $Fe_2O_3$ | 0.84 percent |

3 percent Pd was again uniformly applied to this support, resulting in a catalyst in which only 5.3 percent of the interior surface was covered with palladium. The computation was again performed on the basis that 1 g of palladium occupies an area of 334 m² and 3 g occupy 1,002 m². The interior surface area of the catalyst charged with palladium amounted to 175 m²/g and the pore volume was 0.640 l/kg. With this catalyst a yield of 1,045 g of vinyl acetate per liter per hour was achieved, and the synthetized quantity of acetaldehyde was 17.5 g/l·h. 5.7 l of acetic acid containing 15.6 g HCl (gaseous) was combined in a mixing section with the sump product of the second distillation column. The transformation amounted to 9.5 percent of the acetic acid input. The total transformation amounted to 14.1 percent of the circulated ethylene, 97 percent being transformed to vinyl acetate.

Example 5

A solution of 100 l containing 40 g/l Cu(II) acetate, 76 g/l Ba acetate and 9 g/l lithium chloride, and a chlorine ion concentration of 6.0 g/l was pumped each hour through the catalyst chamber of 7.85 liters capacity, which was filled with the same catalyst as in Experiment 4. The residence time in this case amounted to only 4.7 minutes as compared with 7.85 minutes in Examples 3 and 4. In this manner a certain improvement of the yield was achieved, the yield being 1,070 g/l·h. At the same time, however, the concentration of vinyl acetate in the solution dropped from 13.5 percent (Ex. 3) and 13.7 percent (Ex. 4) to 8.4 percent, i.e., reducing the residence time resulted in a less than maximum utilization of the solution, 5.9 l of acetic acid containing 16 g HCl was added hourly. The transformation as regards the acetic acid amounted to 5.9 percent, with reference to the circulated ethylene, the total transformation was 14.3 percent with 97 percent being converted to vinyl acetate.

Example 6

A solution of 100 liters containing 40 g/l Cu acetate, 76 g/l Ba acetate and 9 g/l lithium chloride and having a chlorine ion concentration of 6 g/l was passed through a catalyst which, prior to impregnation with $PdCl_2$, had an interior surface area of 189 m²/g and a pore volume of 0.713 l/kg. The support was charged with 10 percent palladium, i.e., 17.7 percent of the interior surface area was covered with palladium. The production amounted to 14 kg vinyl acetate per hour, which represents a yield of 1,780 g/l.h and 24 g/l.h of acetaldehyde, with a molar ratio of vinyl acetate to acetaldehyde of 38 to 1. The total transformation with reference to the circulated ethylene amounted to 23.7 percent, 98 percent of the ethylene being transformed to vinyl acetate. The consumption of acetic acid per hour amounted to 9.8 l containing 27 g HCl. The transformation with reference to acetic acid amounted to 9.8 percent. After four months of continuing the process, the production diminished to 1,650 g/l·h.

In Examples 1–3 a support was used which had a pore volume of 0.668 l/kg, an interior surface area of 7.9 m²/g, and pores 95 percent of which have a radius of less than 100 A. It was coated with 3 weight percent palladium and 73.5 percent of the support was covered with a monomolecular layer and 26.5 percent with a bimolecular layer of the metal.

The support used in Examples 4 and 5, however, had an interior surface area of 189 m² per gram, a pore volume of 0.713 l/kg, and 40 percent of the pores had a radius of 10 to 100 A and 60 percent of them had a radius of 500 to 4000 A. A 3 percent impregnation with Pd therefore resulted in only 5.3 percent of the interior surface being covered with Pd.

Now, if the yields per unit of volume per unit of time achieved with these two supports (Example 3. 1030 g/l·h; Example 4. 1045 g/l·h) are compared with one another, it will be seen that the palladium charge is the same (3 percent) and no dependence on the interior surface area can be found.

A change in the residence time on the catalyst results in only a slight change of yield to 1,070 g/l·h (Example 5).

On the other hand, shortening the residence time while simultaneously increasing the palladium concentration to 10 percent results in a considerable improvement of the yield per unit of volume per unit of time.

With a residence time of 4.7 minutes and a maximum equilibrium concentration of 14 percent vinyl acetate in solution, a yield of 1,780 g of vinyl acetate per liter per hour (Example 6) can be achieved. The impregnation of the support material with 10 percent Pd means that 17.7 percent of the interior surface area is occupied by palladium.

We claim:

1. In a solution process for the manufacture of vinyl acetate from ethylene, oxygen and liquid acetic acid in the presence of a Cu II-Cu I redox system including a copper salt, acetate ion formers in an amount of from 30 to 50 g/l and a palladium catalyst, the improvement which comprises
   a. adding said catalyst to a catalyst support in amounts in the range of 3 to 12 weight per cent wherein the catalyst support is impregnated with a palladium salt and thereafter reduced to palladium and b. carrying out the reaction
   i. at conditions of temperature and pressure to maintain the acetic acid substantially in the liquid phase and
   ii. in the presence of an amount of oxygen sufficient to maintain the Cu II salt content constantly at at least 90 percent of the total salt concentration.

2. Process of claim 1 wherein the catalyst support has an interior surface area of 10 to 300 m$^2$/g.

3. Process of claim 1 wherein the maximum volume ratio of ethylene to oxygen is 93:7.

4. Process of claim 1 wherein the acetate ion formers are selected from the group of the acetates of lithium, barium, potassium and sodium.

5. Process of claim 1 wherein the moisture content of the solution is 0.3 to 1.5 percent.

6. Process of claim 1 wherein the catalyst support is selected from the group of aluminum silicates, aluminum oxides, aluminum phosphate, silica gel, asbestos, and active carbon.

7. Process of claim 1 wherein the catalyst support is an aluminum silicate support which has been impoverished of aluminum by extraction with hydrochloric acid.

8. Process of claim 7 wherein said impoverished support is impregnated with a palladium chloride solution and thereafter reduced with hydrogen.

* * * * *

UNITED STATES PATENT OFFICE
CERTIFICATE OF CORRECTION

Patent No. 3,843,721      Dated October 22, 1974

Inventor(s) Wilhelm Ester et al

It is certified that error appears in the above-identified patent and that said Letters Patent are hereby corrected as shown below:

Column 3, line 43

"atomic" misspelled

Column 3, line 45

"$\pi^2$" should be "$\pi r^2$"

Signed and sealed this 11th day of February 1975.

(SEAL)
Attest:

RUTH C. MASON
Attesting Officer

C. MARSHALL DANN
Commissioner of Patents
and Trademarks